(12) United States Patent
Yamamoto et al.

(10) Patent No.: US 11,837,987 B2
(45) Date of Patent: Dec. 5, 2023

(54) MOTOR CONTROL DEVICE

(71) Applicant: DENSO CORPORATION, Kariya (JP)

(72) Inventors: Daisuke Yamamoto, Kariya (JP); Seiji Nakayama, Kariya (JP); Jun Yamada, Kariya (JP); Kouji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/828,444

(22) Filed: May 31, 2022

(65) Prior Publication Data

US 2022/0294371 A1 Sep. 15, 2022

Related U.S. Application Data

(63) Continuation of application No. PCT/JP2020/044502, filed on Nov. 30, 2020.

(30) Foreign Application Priority Data

Dec. 2, 2019 (JP) .................................. 2019-217784

(51) Int. Cl.
| | |
|---|---|
| *F16H 61/32* | (2006.01) |
| *H02P 6/24* | (2006.01) |
| *H02K 11/33* | (2016.01) |
| *H02P 6/28* | (2016.01) |

(Continued)

(52) U.S. Cl.
CPC ................ *H02P 6/24* (2013.01); *H02K 11/33* (2016.01); *H02P 6/16* (2013.01); *H02P 6/28* (2016.02); *H02P 25/08* (2013.01)

(58) Field of Classification Search
CPC . F16H 61/32; H02P 25/08; H02P 6/24; H02P 6/28; H02P 6/16
See application file for complete search history.

(56) References Cited

U.S. PATENT DOCUMENTS

| | | |
|---|---|---|
| 2003/0222617 A1 | 12/2003 | Nakai et al. |
| 2006/0033464 A1 | 2/2006 | Nakai et al. |
| (Continued) | | |

FOREIGN PATENT DOCUMENTS

| | | |
|---|---|---|
| JP | S61-161510 | 7/1986 |
| JP | H02-292190 | 12/1990 |
| JP | 2015-024478 | 2/2015 |

*Primary Examiner* — Cortez M Cook
(74) *Attorney, Agent, or Firm* — Nixon & Vanderhye P.C.

(57) ABSTRACT

A motor control device controls a drive of a motor in a motor drive system including the motor and a detent mechanism. The detent mechanism has a detent member that rotates integrally with an output shaft to which the rotation of the motor is transmitted, and an engaging member that moves a valley portion by a rotation of the motor and positions the output shaft by stopping within a positioning range. The motor control device includes a positioning determination unit and an energization control unit. The positioning determination unit determines whether or not the engaging member is stopped within the positioning range based on control parameter other than a detection value of a motor rotation angle sensor that detects a motor rotation angle. When the energization control unit determines that the engaging member is stopped within the positioning range, the energization control unit turns off the energization of the motor.

6 Claims, 13 Drawing Sheets

(51) Int. Cl.
*H02P 6/16* (2016.01)
*H02P 25/08* (2016.01)

(56) References Cited

U.S. PATENT DOCUMENTS

| | | | |
|---|---|---|---|
| 2006/0163025 A1* | 7/2006 | Hori | H02P 25/08 |
| | | | 192/219.5 |
| 2006/0197489 A1 | 9/2006 | Nakai et al. | |
| 2007/0182353 A1 | 8/2007 | Kamio et al. | |
| 2009/0193923 A1 | 8/2009 | Nakai et al. | |
| 2011/0068730 A1 | 3/2011 | Nakai et al. | |
| 2015/0102755 A1 | 4/2015 | Reimann | |
| 2017/0307072 A1* | 10/2017 | Yamada | F16H 61/32 |

* cited by examiner

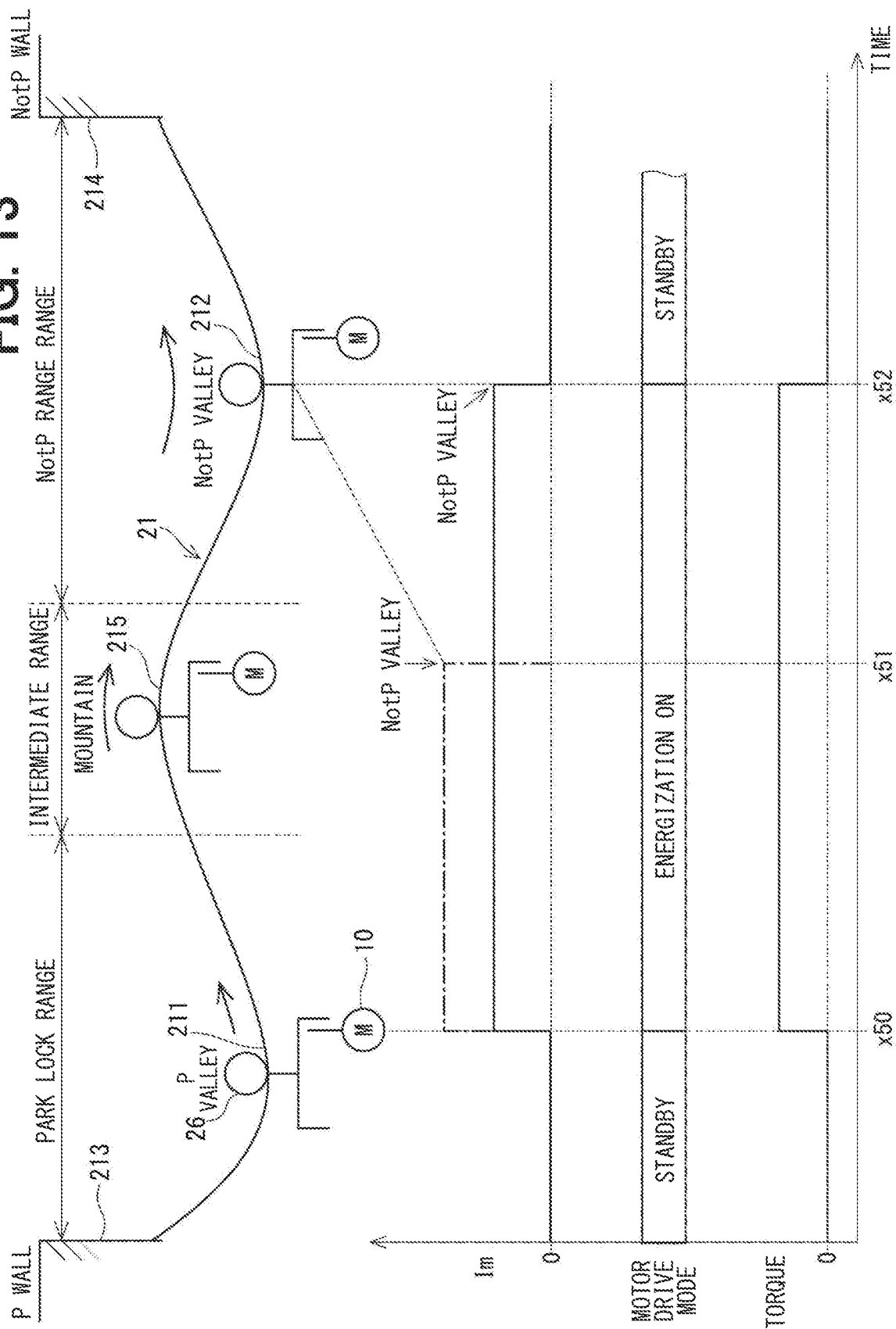

MOTOR CONTROL DEVICE

CROSS REFERENCE TO RELATED APPLICATIONS

This application is a continuation application of International Patent Application No. PCT/JP2020/044502 filed on Nov. 30, 2020, which designated the U.S. and based on and claims the benefits of priority of Japanese Patent Application No. 2019-217784 filed on Dec. 2, 2019. The entire disclosure of all of the above applications is incorporated herein by reference.

TECHNICAL FIELD

The present disclosure relates to a motor control device.

BACKGROUND

Conventionally, a motor control device drives a range switching mechanism that switches a range of an automatic transmission of a vehicle by using a motor such as a switched reluctance motor as a drive source.

SUMMARY

An object of the present disclosure is to provide a motor control device capable of appropriately positioning a rotation position in a rotation transmission system without using a motor rotation angle sensor.

A motor control device of the present disclosure controls a drive of a motor in a shift range switching system including a motor and a detent mechanism. The detent mechanism has a detent member and an engaging member. The detent member is formed with a plurality of valley portions, a mountain portion separating the valley portions, and wall portions provided at both ends of the valley portions arranged, and rotates integrally with an output shaft to which the rotation of the motor is transmitted. The engaging member can move in the valley portion by the rotation of the motor, and positions the output shaft by stopping within a positioning range.

The motor control device includes a positioning determination unit and an energization control unit. The positioning determination unit determines whether or not the engaging member can be stopped within the positioning range based on control parameters other than a detection value of a motor rotation angle sensor that detects the motor rotation angle. When the energization control unit determines that the engaging member can be stopped within the positioning range, the energization control unit turns off the energization of the motor. As a result, an output shaft can be appropriately positioned without using a motor rotation angle sensor.

BRIEF DESCRIPTION OF DRAWINGS

The above and other objects, features and advantages of the present disclosure will become more apparent from the following detailed description made with reference to the accompanying drawings. In the drawings:

FIG. 13 is a time chart for explaining a motor control process according to a fifth embodiment.

DETAILED DESCRIPTION

In an assumable example, a motor control device drives a range switching mechanism that switches a range of an automatic transmission of a vehicle by using a motor such as a switched reluctance motor as a drive source. For example, P-range side abutting control and NotP range-side abutting control are performed to learn an amount of play in a rotation transmission system.

By the way, for example, in the case of a DC motor with a brush, the motor can be driven by switching the energization on and off even if there is no angle sensor inside the motor. An object of the present disclosure is to provide a motor control device capable of appropriately positioning a rotation position in a rotation transmission system without using a motor rotation angle sensor.

A motor control device of the present disclosure controls a drive of a motor in a shift range switching system including a motor and a detent mechanism. The detent mechanism has a detent member and an engaging member. The detent member is formed with a plurality of valley portions, a mountain portion separating the valley portions, and wall portions provided at both ends of the valley portions arranged, and rotates integrally with an output shaft to which the rotation of the motor is transmitted. The engaging member can move in the valley portion by the rotation of the motor, and positions the output shaft by stopping within a positioning range.

The motor control device includes a positioning determination unit and an energization control unit. The positioning determination unit determines whether or not the engaging member can be stopped within the positioning range based on control parameters other than a detection value of a motor rotation angle sensor that detects the motor rotation angle. When the energization control unit determines that the engaging member can be stopped within the positioning range, the energization control unit turns off the energization of the motor. As a result, an output shaft can be appropriately positioned without using a motor rotation angle sensor.

First Embodiment

Figure 1:
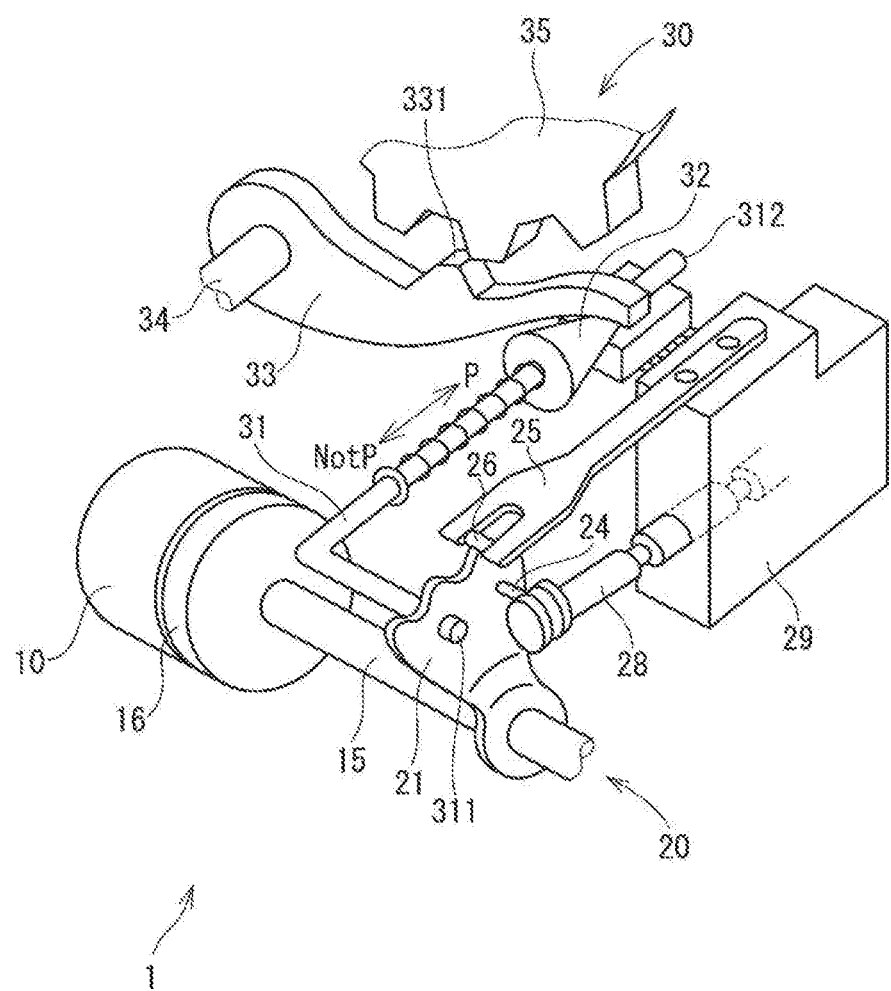
FIG. 1 is a perspective view showing a shift-by-wire system according to a first embodiment.
Figure 2:
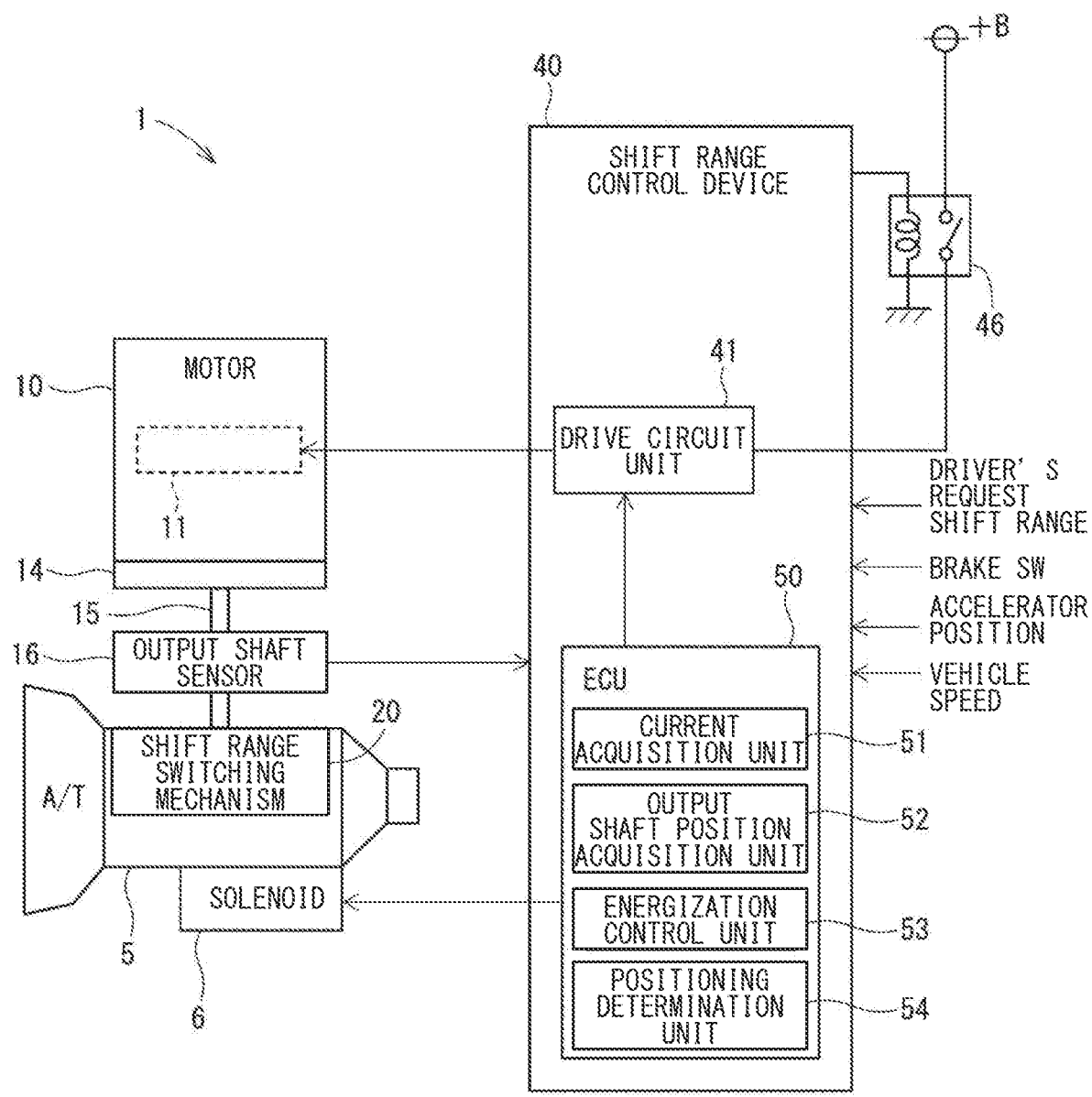
FIG. 2 is a diagram showing a schematic configuration of the shift-by-wire system according to the first embodiment.
Figure 3:
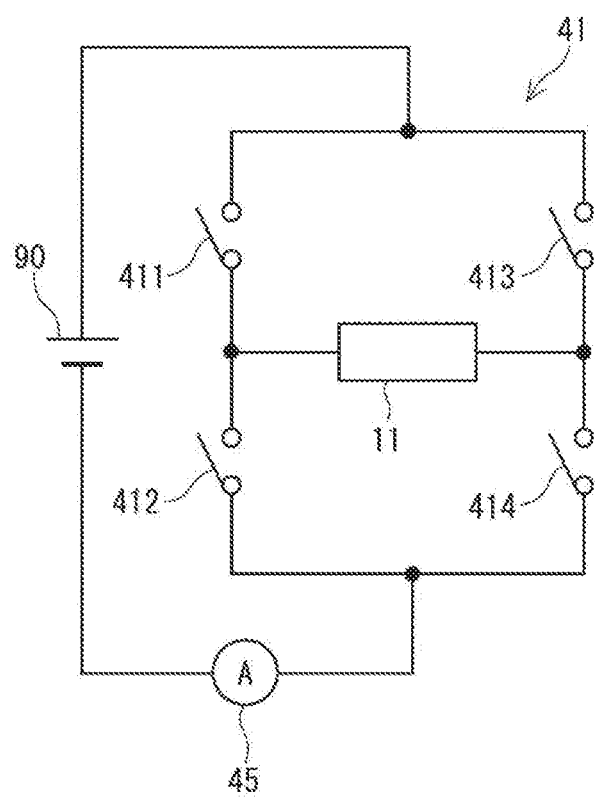
FIG. 3 is a circuit diagram showing a drive circuit according to the first embodiment.

Hereinafter, a motor control device according to the present disclosure will be described with reference to the drawings. Hereinafter, in a plurality of embodiments, a substantially equivalent configuration will be denoted by an identical reference, and explanation thereof will be omitted. A first embodiment is shown in FIGS. 1 to 7. As shown in FIGS. 1 to 3, a shift-by-wire system 1 as a motor drive system includes a motor 10 as an actuator, a shift range switching mechanism 20, a parking lock mechanism 30, and a shift range control device 40 as a motor control device, and the like.

The motor 10 rotates when receiving electric power from a battery 90 as a power supply mounted on a not-shown vehicle to function as a drive source of the shift range switching mechanism 20. The motor 10 of the present embodiment is a DC motor with a brush and has a motor winding 11.

A speed reducer 14 is provided between a motor shaft 105 (refer to FIG. 4 and the like) of the motor 10 and an output shaft 15, decelerates the rotation of the motor 10, and outputs the rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 has a detent plate 21, a detent spring 25 as an urging member, a detent roller 26, and the like, and transmits a rotational driving force output from the speed reducer 14 to a manual valve 28 and the parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 reciprocates in the axial direction, a hydraulic supply path to a hydraulic clutch (not shown) is switched, and an engagement state of the hydraulic clutch is switched. In this way, the shift range is switched.

Figure 4:
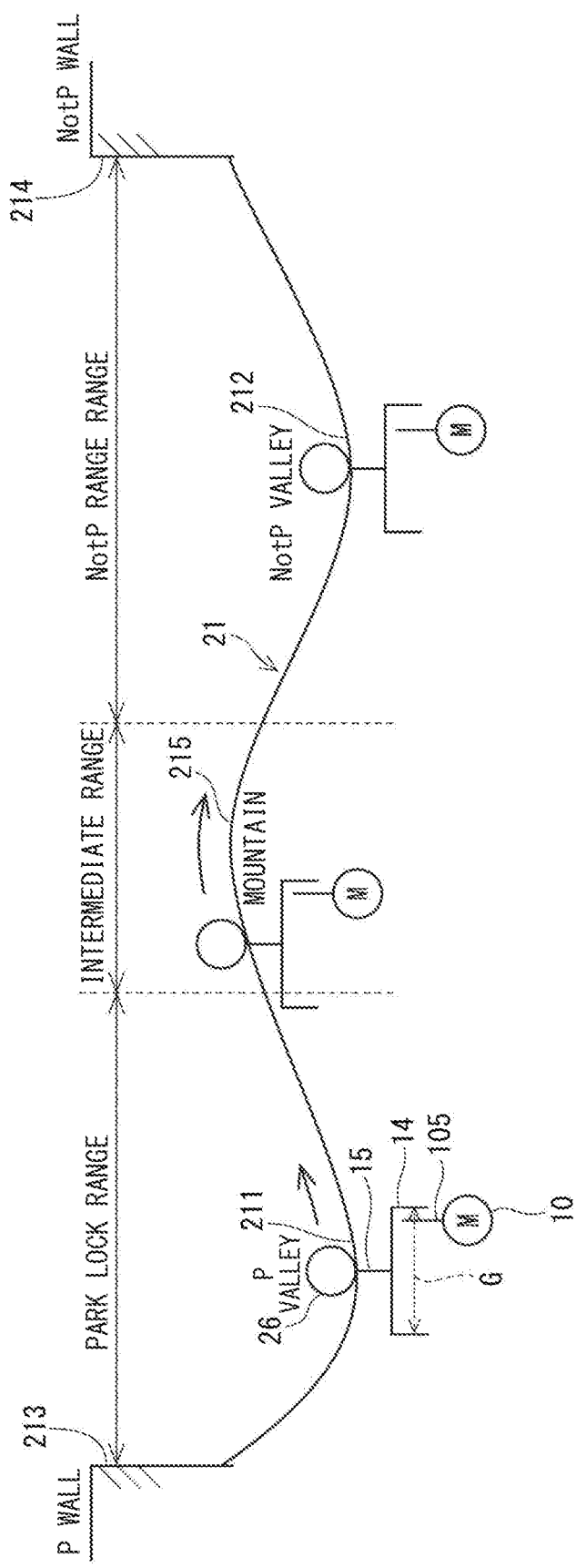
FIG. 4 is a schematic view showing a detent mechanism according to the first embodiment.

Two valley portions 211 and 212 are provided on the detent spring 25 side of the detent plate 21 (see FIG. 4 and the like). In the present embodiment, the valley portion 211 corresponds to a P range, and the valley portion 212 corresponds to a NotP range, which is a range other than the P range.

FIG. 4 schematically shows the relationship between the motor shaft 105, which is the rotation shaft of the motor 10, the output shaft 15, and the detent plate 21. As shown in FIG. 4, in the detent plate 21, a mountain portion 215 is formed between the valley portion 211 corresponding to the P range and the valley portion 212 corresponding to the NotP range which is a range other than the P range. Further, a wall portion 213 that regulates the movement of the detent roller 26 is formed on the opposite side of the valley portion 211 from the mountain portion 215, and a wall portion 214 that regulates the movement of the detent roller 26 is formed on the opposite side of the valley portion 212 from the mountain portion 215. In the figure, the valley portion 211 is described as "P valley", the valley portion 212 is described as "NotP valley", the wall portion 213 is described as "P wall", the wall portion 214 is described as "NotP wall", and the mountain portion 215 is described as "mountain".

A play is formed between the motor shaft 105 and the output shaft 15. In FIG. 4, the speed reducer 14 and the output shaft 15 are integrated, and a "play" is formed between the motor shaft 105 and the speed reducer 14, but the motor shaft 105 and the speed reducer 14 may be integrated and a "play" may be formed between the speed reducer 14 and the output shaft 15. The "play" can be regarded as the total amount of plays provided between the motor shaft 105 and the output shaft 15, and is appropriately referred to as "play G" below.

FIG. 4 shows a state in which the detent roller 26 moves between the valley portions 211 and 212 as the output shaft 15 rotates, regarding a rotation direction of the motor 10 as a left-right direction on a paper surface. Actually, the detent roller 26 moves between the valley portions 211 and 212 due to the rotation of the detent plate 21, but in FIG. 4, for the sake of explanation, the detent roller 26 is shown to move together with the output shaft 15. Further, in order to avoid complication, the reference numerals are omitted as appropriate.

Returning to FIG. 1, the detent spring 25 is an elastically deformable plate-like member, and is provided with a detent roller 26 at a tip of the detent spring 25. The detent spring 25 urges the detent roller 26 toward a rotation center side of the detent plate 21, that is, a side that fits into the valley portions 211 and 212. When a rotational force equal to or greater than a predetermined force is applied to the detent plate 21, the detent spring 25 is elastically deformed, and the detent roller 26 moves between the valley portions 211 and 212. When the detent roller 26 is fitted into any one of the valley portions 211 and 212, the swinging motion of the detent plate 21 is regulated, the axial position of the manual valve 28 and the state of the parking lock mechanism 30 are determined, and the shift range of an automatic transmission 5 is fixed. The detent roller 26 fits into the valley portion 211 when the shift range is the P range, and fits into the valley portion 212 when the shift range is the Not P range.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312.

The parking lock pawl 33 is configured to abut on a conical surface of the conical member 32 and to pivot around the shaft part 34, and the parking lock pawl 33 has a protrusion 331 on the side of the parking gear 35. The protrusion 331 is configured to mesh with the parking gear 35. When the detent plate 21 rotates in the reverse rotation direction and the conical member 32 moves in a P direction, the parking lock pawl 33 is pushed up, and the protrusion 331 meshes with the parking gear 35. On the other hand, when the detent plate 21 rotates in the forward rotational direction and the conical member 32 moves in a NotP direction, the engagement between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is the NotP range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIGS. 2 and 3, the shift range control device 40 includes a drive circuit unit 41, a control unit 50, and the like. In the figure, the control unit 50 is referred to as "ECU". As shown in FIG. 3, the drive circuit unit 41 has four switching elements 411 to 414 and constitutes an H-bridge circuit. The switching elements 411 to 414 of the present embodiment are MOSFETs, but may be IGBTs or the like. When the motor 10 is rotated in a forward direction, the switching elements 411 and 414 are turned on, and when the motor 10 is rotated in a reverse direction, the switching elements 412 and 413 are turned on. Since the motor 10 of the present embodiment is a motor with a brush, the motor 10 can be driven by on/off control of the switching elements 411 to 414 without using a detection value of a rotation angle sensor. Therefore, the rotation angle sensor provided inside the motor 10 can be omitted.

A current sensor 45 detects a motor current Im, which is a current of the motor winding 11. In FIG. 3, the current sensor 45 is provided on a low potential side of the drive circuit unit 41, but may be provided on a high potential side of the drive circuit unit 41, between a connection point of the switching elements 411 and 421 and the motor winding 11, or between a connection point of the switching elements 413 and 414 and the motor winding 11.

As shown in FIG. 2, the control unit 50 is mainly composed of a microcomputer and the like, and internally includes, although not shown in the figure, a CPU, a ROM, a RAM, an I/O, a bus line for connecting these components, and the like. Each processing executed by each of the control units 50 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit.

The control unit 50 includes a current acquisition unit 51, an output shaft position acquisition unit 52, an energization control unit 53, a positioning determination unit 54, and the like. The current acquisition unit 51 acquires the motor current Im based on the detection value of the current sensor 45.

The output shaft position acquisition unit 52 detects an output shaft angle θs, which is a rotation position of the output shaft 15, based on a detection value of the output shaft sensor 16. In the present embodiment, the rotation of the motor 10 is transmitted to the output shaft 15 via the speed reducer 14. A "play" is formed between the output shaft 15 and the motor shaft 105. Therefore, although a motor angle θm and an output shaft angle θs can be roughly converted according to a gear ratio of the speed reducer 14, a converted value of the output shaft angle θs does not always match the motor angle θm according to an actual rotor position due to an influence of a backlash G.

The energization control unit 53 controls the on/off operation of the switching elements 411 to 414, and controls the energization of the motor winding 11 to control the drive of the motor 10. In the present embodiment, the detection value of the rotation angle sensor that detects the rotor position, such as an encoder, is not used for the on/off control of the switching elements 411 to 414. The positioning determination unit 54 determines whether or not the detent roller 26 can be stopped within a positioning range that satisfies the range switching.

As shown in FIG. 4, when the shift range is switched from the P range to the NotP range, the motor 10 is rotated in the forward direction, and as shown by the solid arrow in FIG. 4, the detent roller 26 is moved to the valley portion 212 from the valley portion 211 via the mountain portion 215. At this time, the motor 10 is controlled so that the detent roller 26 stops within the NotP range range.

Further, when the shift range is switched from the NotP range to the P range, the detent roller 26 is moved from the valley portion 212 to the valley portion 211 via the mountain portion 215 by moving the motor 10 in the reverse direction. At this time, the motor 10 is controlled so that the detent roller 26 stops within the park lock range. That is, when switching from the P range to the NotP range, the NotP range corresponds to the "positioning range", and when switching from the NotP range to the P range, the park lock range corresponds to the "positioning range". Hereinafter, switching from the P range to the NotP range will be mainly described.

By the way, when a switched reluctance motor is used as a drive source of the shift-by-wire system 1, for example, the rotor is rotated by switching the energized phase based on the detection value of the rotation angle sensor of the motor such as an encoder. Further, an abutting control is performed in which the detent roller 26 is abutted against the wall portions 213 and 214, and the amount of play between the motor shaft 105 and the output shaft 15 is learned based on the encoder count value. Then, by using the learned play amount and switching the energized phase according to the detection value of the motor rotation angle sensor, the positioning accuracy is satisfied.

On the other hand, in the DC motor with a brush, the rotor can be rotated by switching the energization on and off without switching the energizing phase. That is, in the case of a DC motor with a brush, it is not necessary to provide a rotation angle sensor inside the motor. Further, when the motor 10 having no rotation angle sensor is used as the drive source of the shift-by-wire system 1, the play amount cannot be learned.

Figure 5:
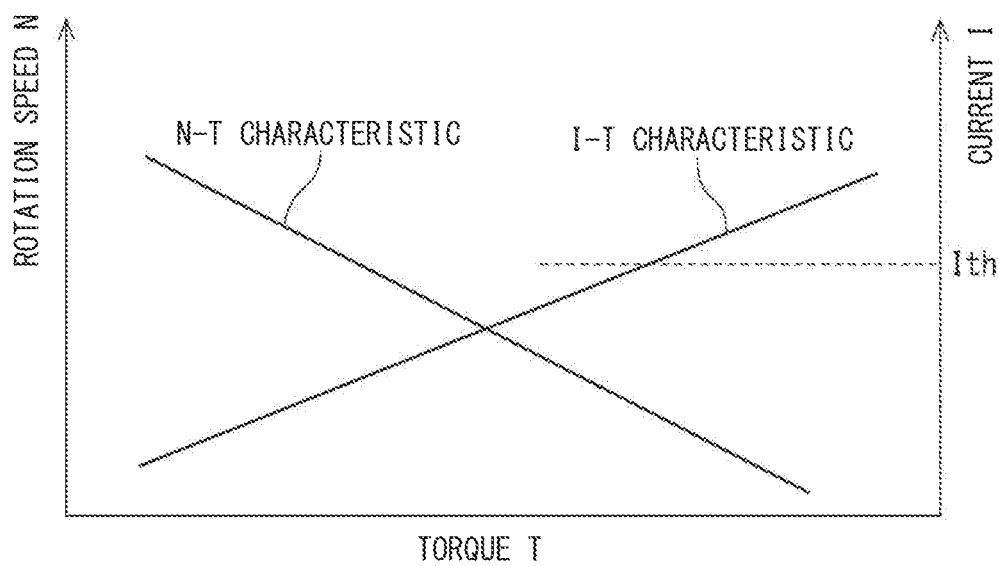
FIG. 5 is a characteristic diagram showing motor characteristics according to the first embodiment.

Therefore, in the present embodiment, in order to switch the range without using the rotation angle sensor inside the motor 10, it is determined that the detent roller 26 is within the positioning range by bringing the detent roller 26 into contact with the wall portions 213 and 214. As shown in FIG. 5, when the detent roller 26 comes into contact with the wall portions 213 and 214, the rotation speed N becomes small, the torque T becomes large, and the current I becomes large. Therefore, in the present embodiment, when the state where the motor current Im is the contact determination value Is or more is a contact determination time Xth1 or more, it is determined that the detent roller 26 is in contact with the wall portions 213 and 214 and is within the positioning range, and the energization of the motor 10 is turned off.

Figure 6:
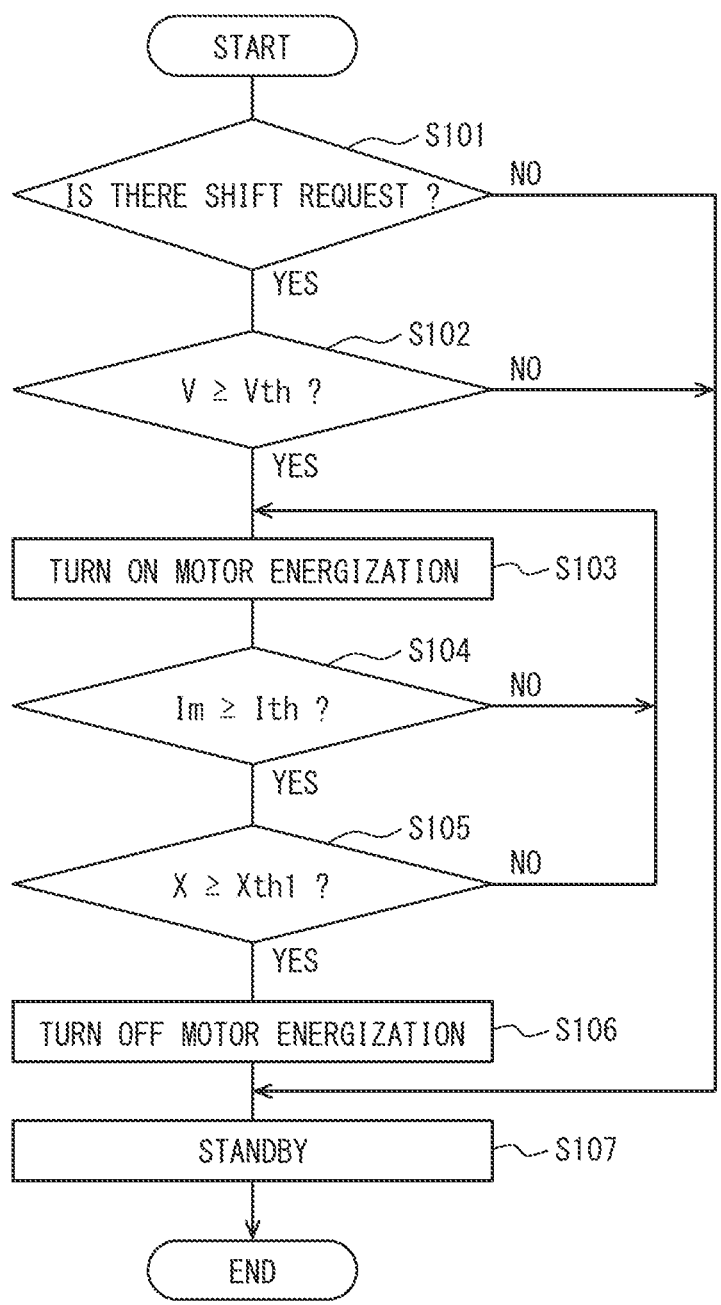
FIG. 6 is a flowchart illustrating a motor control process according to the first embodiment.

The motor control process will be described with reference to a flowchart of FIG. 6. This process is executed by the control unit 50 at a predetermined cycle. Hereinafter, "step" in step S101 is omitted, and is simply referred to as a symbol "S." The same applies to the other steps.

In S101, the control unit 50 determines whether or not there is a shift range switching request. If it is determined that there is no shift range switching request (S101: NO), the process proceeds to S107 and a standby is maintained. When it is determined that there is a shift range switching request (101: NO), the process proceeds to S102.

In S102, the control unit 50 determines whether or not an input voltage V is equal to or higher than a voltage determination value Vth. In the present embodiment, the input voltage V is a battery voltage. When it is determined that the input voltage V is smaller than the voltage determination value Vth (S102: NO), the process proceeds to S107 and the standby is continued. When it is determined that the input voltage V is equal to or higher than the voltage determination value Vth (S102: YES), the process proceeds to S103 and the energization of the motor 10 is turned on. Here, based on the detection value of the current sensor 45, the on/off operation of the switching elements 411 to 414 is controlled so that the motor current Im becomes constant by a current feedback control. Further, the motor 10 may be energized with a constant duty.

In S104, the positioning determination unit 54 determines whether or not the motor current Im is equal to or greater than a contact determination value Ith. The contact determination value Ith is set to a value sufficiently larger than the current flowing when the detent roller 26 moves between the valley portions 211 and 212. When it is determined that the motor current Im is less than the contact determination value Ith (S104: NO), the process returns to S103 and the energization of the motor 10 is continued. When it is determined that the motor current Im is equal to or greater than the contact determination value Ith (S104: YES), the process proceeds to S105.

In S105, the positioning determination unit 54 determines whether or not an elapsed time X after the motor current Im becomes the contact determination value Ith or more is the contact determination time Xth1 or more. The contact determination time Xth1 is set according to the time during which it can be determined that the detent roller 26 is in contact with the wall portions 213 and 214 in order to prevent erroneous determination due to noise or the like. When it is determined that the elapsed time X is less than the contact determination time Xth1 (S105: NO), the process returns to S103 and the energization of the motor 10 is continued. When it is determined that the elapsed time X1 is equal to or longer than the contact determination time Xth1 (S105: YES), the process proceeds to S106. In S106, the energization control unit 53 turns off the energization of the motor 10. In S107, the control unit 50 sets the motor drive mode to standby.

Figure 7:
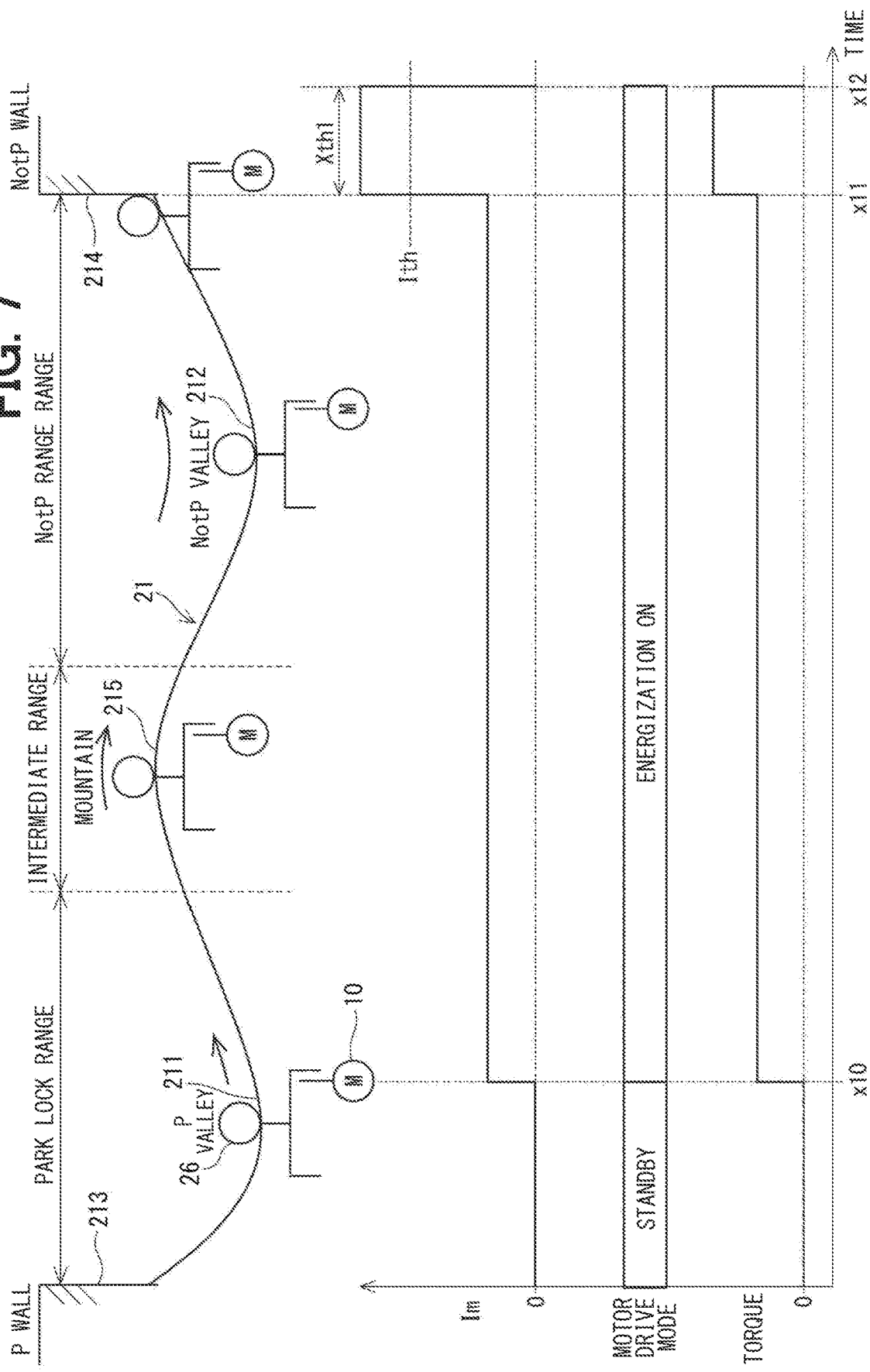
FIG. 7 is a flowchart explaining a motor control process according to the first embodiment.

The motor control process according to the present embodiment will be explained with reference to a time chart of FIG. 7. In FIG. 7, a schematic diagram showing a behavior of the detent roller 26 corresponding to FIG. 4 is shown in an upper row, and a time chart is shown in a lower row. In the time chart, a common time axis is a horizontal axis, and the motor current Im, the motor drive mode, and the torque are shown in order from a top. In order to avoid complication, the reference numerals in the schematic diagram are omitted as appropriate. The same applies to the time chart according to the embodiment described later.

When there is a shift range switching request at time x10 and the power supply to the motor 10 is turned on, the detent roller 26 moves from the valley portion 211 to the valley portion 212 side by the drive of the motor 10.

When the detent roller 26 comes into contact with the wall portion 214 at time x11, the motor current Im and the motor torque become larger than before the contact. At the time x12 when the contact determination time Xth1 has elapsed since the motor current Im becomes the contact determination value Ith or more, the energization of the motor 10 is turned off. In the present embodiment, the energization is turned off without performing stop control such as fixed phase energization control.

When the power to the motor 10 is turned off while the detent roller 26 is in contact with the wall portion 214, the detent roller 26 does not exceed the valley portion 212 and return to the mountain portion 215 side, even if the detent roller 26 is separated from the wall portion 214 by a spring force of the detent spring 25 and a restoring force of the motor 10. Therefore, the detent roller 26 can be reliably stopped within the NotP range range without using the rotation angle sensor inside the motor 10.

As described above, the shift range control device 40 of the present embodiment controls the drive of the motor 10 in the shift-by-wire system 1. The shift-by-wire system 1 includes the motor 10 and the shift range switching mechanism 20. The shift range switching mechanism 20 includes the detent plate 21 and the detent roller 26. The detent plate 21 is formed with a plurality of valley portions 211, 212, the mountain portion 215 separating the plurality of valley portions 211 and 212, and the wall portions 213 and 214 provided at both ends of the arranged valley portions 211 and 212, and rotates integrally with the output shaft 15 to which the rotation of the motor is transmitted. The detent roller 26 can move the valley portions 211 and 212 by the rotation of the motor 10, and positions the output shaft 15 by stopping within the positioning range corresponding to the required shift range.

The shift range control device 40 includes the positioning determination unit 54 and the energization control unit 53. The positioning determination unit 54 determines whether or not the detent roller 26 can be stopped within the positioning range based on control parameters other than the detection value of the motor rotation angle sensor that detects the motor rotation angle. When the energization control unit 53 determines that the detent roller 26 can be stopped within the positioning range, the energization control unit 53 turns off the energization to the motor 10. As a result, the output shaft 15 can be positioned without using a motor rotation angle sensor such as an encoder, and the shift range can be appropriately switched.

In the present embodiment, the motor current Im energized in the motor 10 is used as the control parameter. In the positioning determination unit 54, when the state in which the motor current Im is equal to or higher than the contact determination value Ith continues for the contact determination time Xth 1, it is determined that the detent roller 26 is in contact with the wall portions 213 and 214 adjacent to the valley portions 211 and 212 according to the required shift range, and the detent roller 26 can be stopped within the positioning range. By bringing the detent roller 26 into contact with the wall portions 213 and 214, positioning can be reliably satisfied.

Second Embodiment

Figure 8:
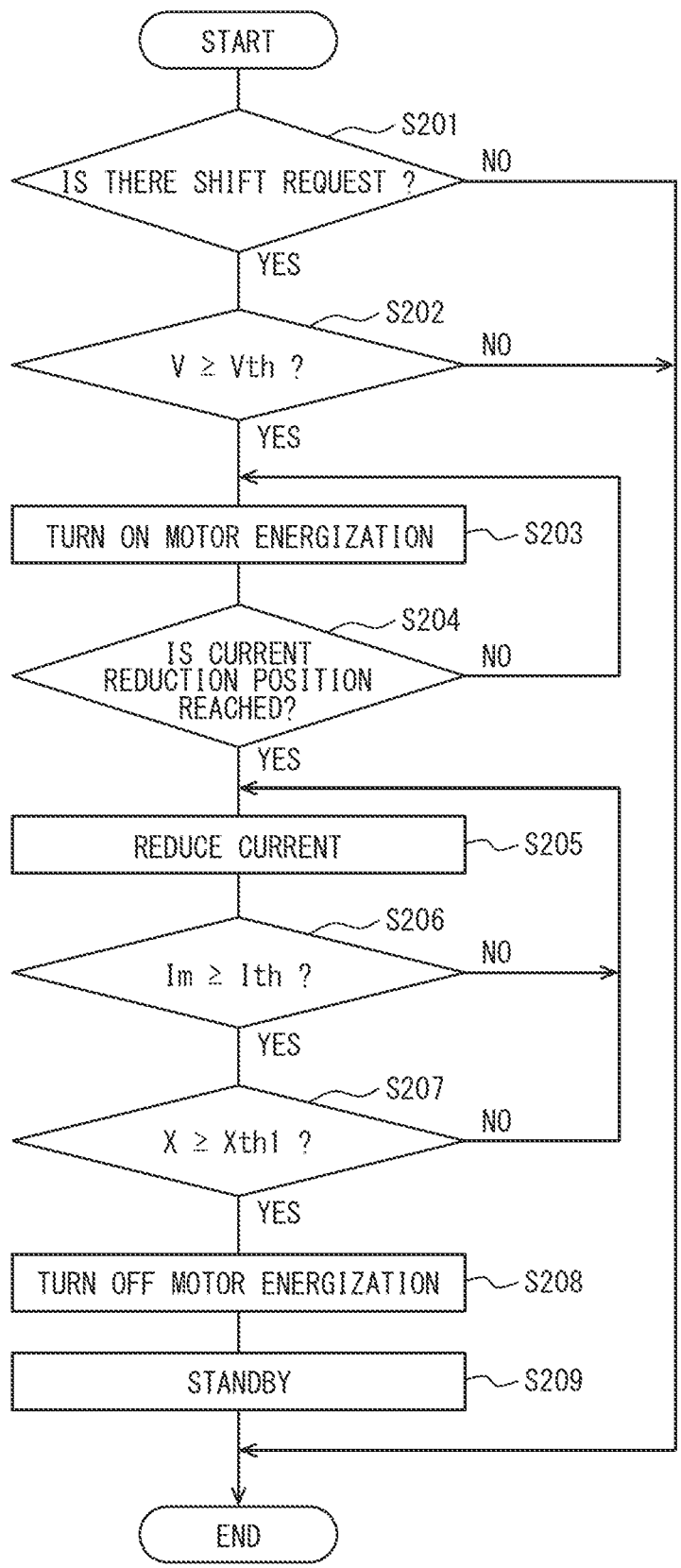
FIG. 8 is a flowchart illustrating a motor control process according to a second embodiment.
Figure 9:
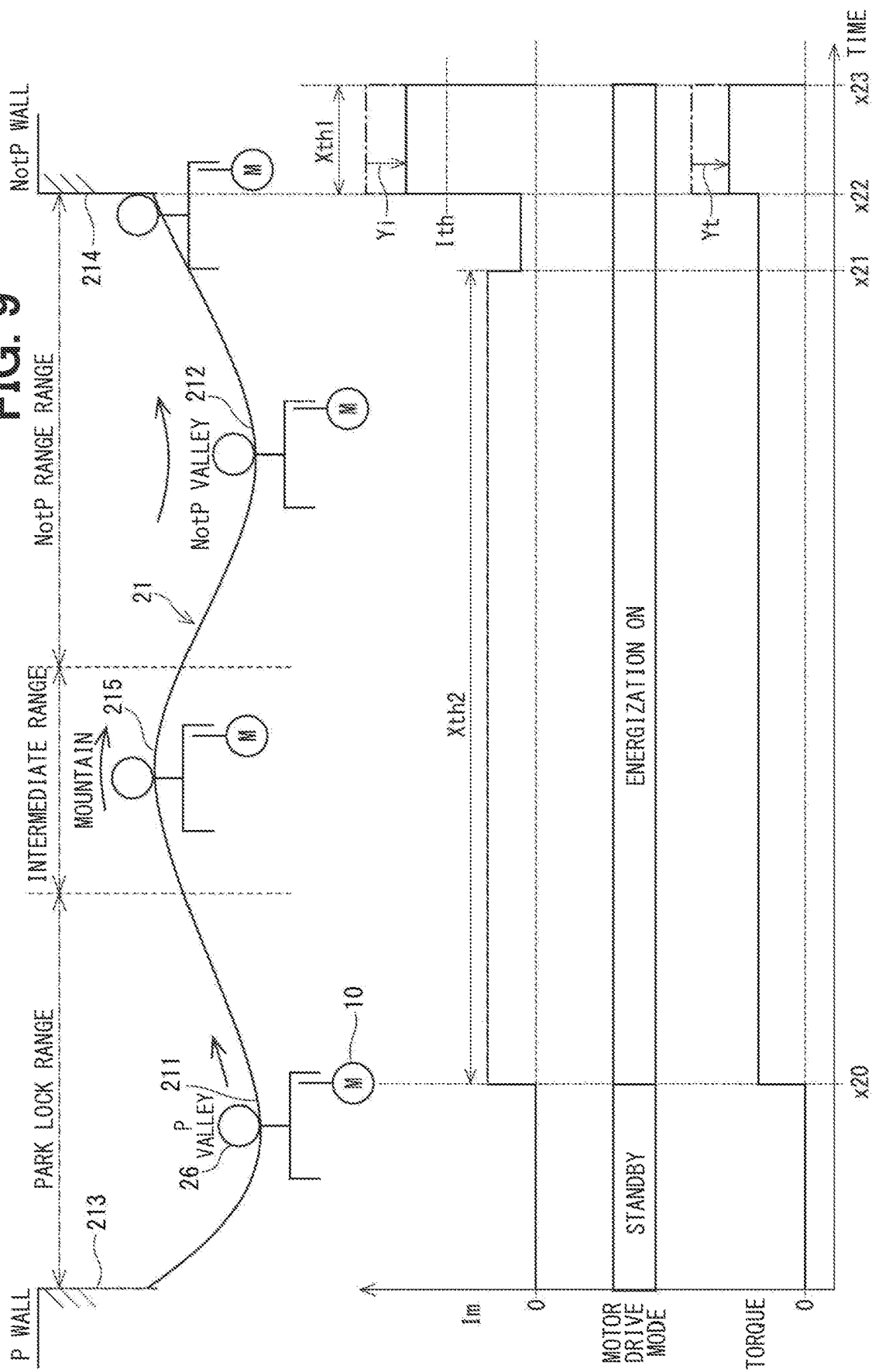
FIG. 9 is a time chart for explaining motor control process according to a second embodiment.

A second embodiment is shown in FIGS. 8 and 9. The present embodiment is different from the embodiments described above in the motor control process, and therefore, explanation will be made mainly on this issue. The motor control process of the present embodiment will be described based on the flowchart of FIG. 8. The processes of S201 to S203 is the same as the processes of S101 to S103 in FIG. 6.

In S204, the control unit 50 determines whether or not the detent roller 26 has reached a current reduction position. The current reduction position is between the valley portion 212 and the wall portion 214 when switching from the P range to the NotP range, and is between the valley portion 211 and the wall portion 213 when switching from the NotP range to the P range. From the viewpoint of responsiveness, the current reduction position is preferably set to a position as close as possible to the wall portions 213 and 214.

In the present embodiment, when a motor drive time Xd, which is the elapsed time from the start of energization, becomes a determination time Xth2 for reaching the current reduction position or more, it is determined that the detent roller 26 has reached the current reduction position. Further, for example, it may be determined whether or not the detent roller 26 has reached the current reduction position based on the detection value of the output shaft sensor 16. Furthermore, the determination may be made based on an energization amount A, which is a time integral value of the motor current Im. The energization amount A can be calculated as the product of the motor current Im and the motor drive time Xd, assuming that the motor current Im is constant (see equation (1)).

$$A = Im \times Xd \quad (1)$$

When it is determined that the detent roller 26 has not reached the current reduction position (S204: NO), the process returns to S203 and continues to energize the motor 10. When it is determined that the detent roller 26 has reached the current reduction position (S204: YES), the process proceeds to S205.

In S205, the control unit 50 reduces the motor current Im. The reduced motor current Im is an arbitrary value that is small enough to drive the detent roller 26 up to the wall portions 213 and 214 and is smaller than that before the reduction. The processes of S206 to S209 is the same as the processes of S104 to S107. If a negative judgment is made in S206 or S207, energization is continued while the motor current Im is reduced.

The motor control process of the present embodiment will be described with reference to the time chart of FIG. 9. The process of the time x20 is the same as the process of the time x10 in FIG. 7. When the detent roller 26 reaches the current reduction position at time x21, the motor current Im is reduced. The processes after the time x22 is the same as the processes after the time x21 in FIG. 7.

In the present embodiment, by reducing the motor current Im before the detent roller 26 reaches the wall portion 214, the motor current Im and the torque at the contact determination time Xth1 can be reduced as shown by the arrows Yi and Yt. Further, the current reduction position may be set to a position where the detent roller 26 is in contact with the wall portion 214, and the motor current Im may be reduced after the detent roller 26 is in contact with the wall portion 214.

In the present embodiment, in a case where it is determined that the detent roller 26 can be stopped within the positioning range because the detent roller 26 is in contact with the wall portions 213 and 214 adjacent to the valley portions 211 and 212 according to the required shift range, the energization control unit 53 makes the motor current Im energized in the motor 10 smaller than the motor current Im before reaching the current reduction position, when it is determined that the detent roller 26 has reached the current reduction position on the front side where the detent roller 26 is in contact with the wall portions 213 and 214. As a result, the amount of energization for the contact determination time Xth1 can be suppressed. Further, an impact when the detent roller 26 comes into contact with the wall portions 213 and 214 can be suppressed. In addition, the same effects as that of the embodiment described above can be obtained.

Third Embodiment

Figure 10:
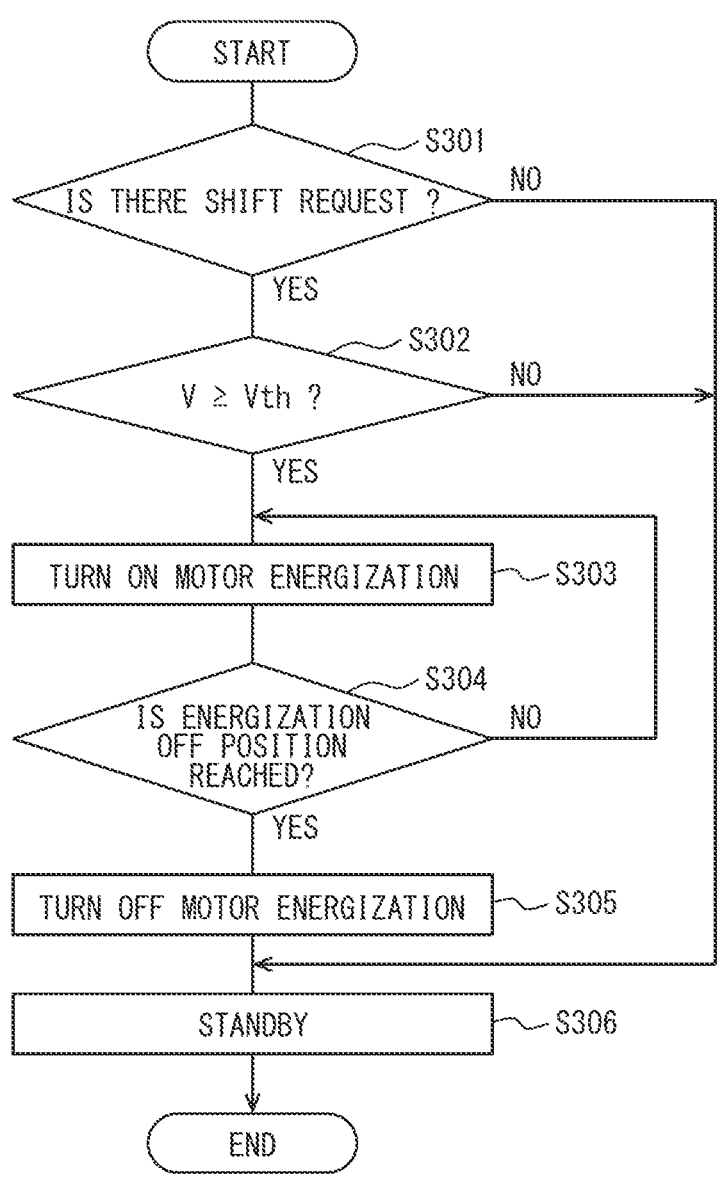
FIG. 10 is a flowchart illustrating a motor control process according to a third embodiment.

A third embodiment will be described with reference to FIGS. 10 and 11. A motor control process according to the present embodiment will be described with reference to a flowchart of FIG. 10. The processes of S301 to S303 is the same as the processes of S101 to S103 in FIG. 6.

In S304, it is determined whether or not the detent roller 26 has reached an energization off position based on the detection value of the output shaft sensor 16. The energization off position is arbitrarily set according to the position where the detent roller 26 can be stopped within the positioning range according to the required range. Details will be described with reference to the time chart of FIG. 11. When it is determined that the detent roller 26 has not been reached the energization off position (S304: NO), the process returns to S303 and energization of the motor 10 is continued. When it is determined that the detent roller 26 has been reached the energization off position (S304: YES), the process proceeds to S305. The processes in S305 and S306 is the same as the processes in S106 and S107 in FIG. 6.

The motor control process of the present embodiment will be described with reference to the time chart of FIG. 11. FIG. 11 shows an output shaft angle θs instead of the motor current Im of the above embodiment. Here, the output shaft angle when the detent roller 26 is located at the apex of the mountain portion 215 is θs1, the output shaft angle when the detent roller 26 is located at the bottom of the valley portion 212 is θs2, and the output shaft range when the detent roller 26 is in contact with the wall portion 214 is θs3.

The process of the time x30 is the same as the process of the time x10 in FIG. 7. When the output shaft angle θs exceeds the angle θs1 at the time x31, it is considered that the detent roller 26 exceeds the mountain portion 215, and the energization to the motor 10 is turned off. If the detent roller 26 exceeds the mountain portion 215, the detent roller 26 is dropped to the valley portion 212 by the urging force of the detent spring 25 and can be positioned within the NotP range range.

That is, at time x31, although the detent roller 26 has not reached the NotP range range, the detent roller 26 can move to the NotP range range if the energization is turned off. That is, the timing of turning off the energization does not necessarily have to be within the positioning range of the detent roller 26. In other words, if the detent roller 26 exceeds the mountain portion 215, it may be determined that "the engaging member can be stopped within the positioning range".

Further, when the output shaft angle θs becomes an angle θs2 at the time x32, it may be considered that the detent roller 26 is located at the valley portion 212, and the energization to the motor 10 may be turned off. Furthermore, when the output shaft angle θs becomes the angle θs3 at the time x33, it may be considered that the detent roller 26 is in contact with the wall portion 214, and the energization of the motor 10 may be turned off. At this time, as in the second embodiment, the motor current Im may be reduced before the detent roller 26 comes into contact with the wall portion 214.

Figure 11:
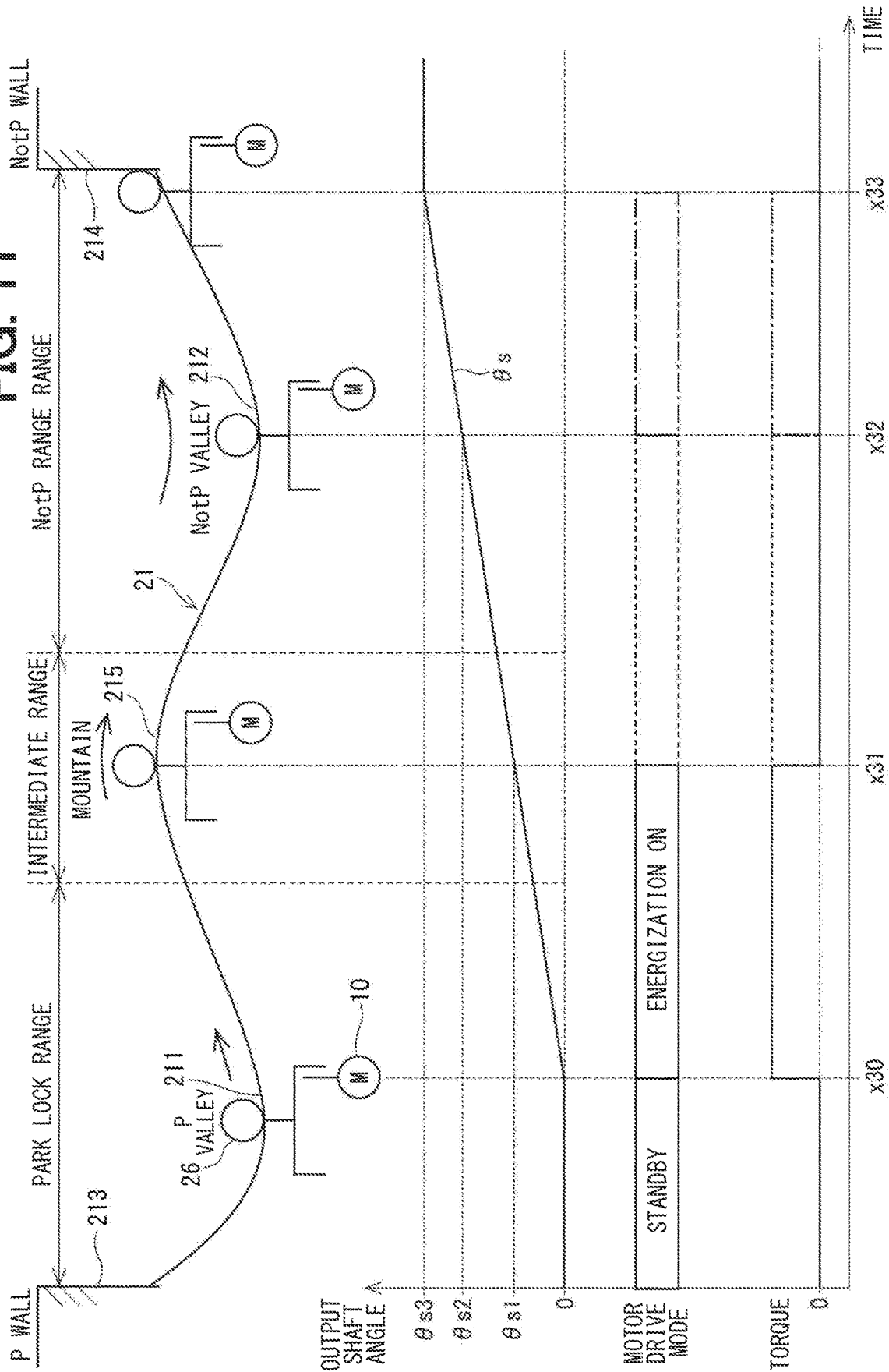
FIG. 11 is a time chart for explaining motor control process according to the third embodiment.

In FIG. 11, the motor drive mode and torque are shown by solid lines in a case where the position of the detent roller 26 is at the mountain portion 215 and the energization is turned off, the motor drive mode and torque are shown by broken lines in a case where the position of the detent roller 26 is at the valley portion 212 and the energization is turned off, and the motor drive mode and torque are shown by dashed lines in a case where the position of the detent roller 26 is at the wall portion 214 and the energization is turned off. The output shaft angle for turning off the energization of the motor 10 can be set to an arbitrary value that allows the detent roller 26 to be stopped within the NotP range range, for example, when the detent roller 26 is considered to have reached the NotP range, or when the detent roller 26 has reached the current reduction position in the second embodiment, and the like. The same also applies to the following embodiments.

In the present embodiment, the positioning determination unit 54 determines whether or not the detent roller 26 can be stopped within the positioning range based on the output shaft angle θs, which is the rotation angle of the output shaft 15. This makes it possible to appropriately determine whether or not the detent roller 26 can be stopped within the positioning range. In addition, the same effects as those of the above embodiment can be obtained.

Fourth Embodiment

Figure 12:
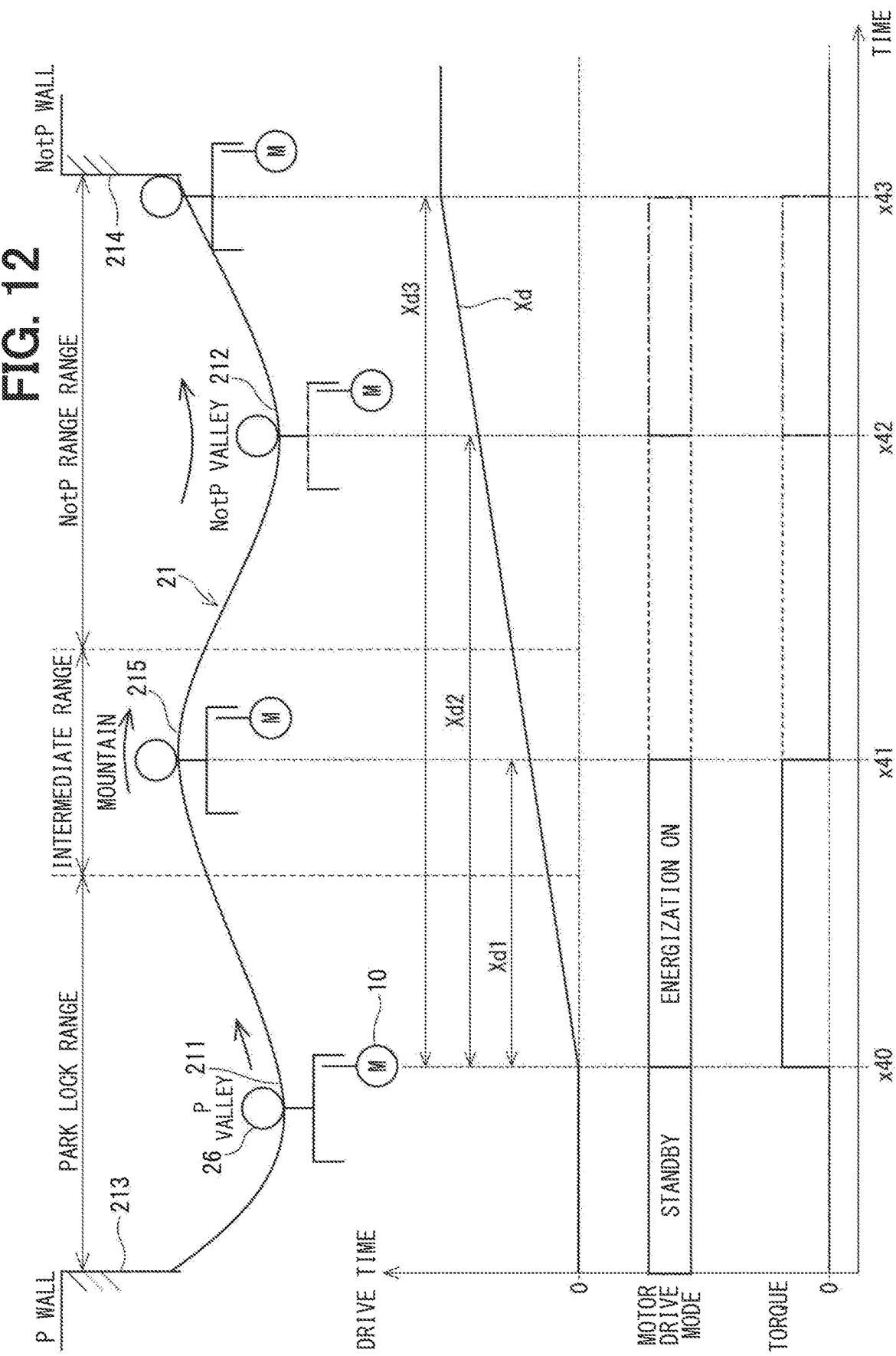
FIG. 12 is a time chart for explaining motor control process according to a fourth embodiment.

A fourth embodiment will be described with reference to FIG. 12. In the motor control process of the present embodiment, the determination of reaching the energization off position of the detent roller 26 in S304 is different from that of the third embodiment, and the determination of reaching the energization off position of the detent roller 26 is made based on a motor drive time Xd instead of the detection value of the output shaft sensor 16. The motor control process of the present embodiment will be described with reference to the time chart of FIG. 12. FIG. 12 shows the motor drive time Xd instead of the output shaft angle θs in FIG. 11. Here, the time required for the detent roller 26 to reach the mountain portion 215 is time Xd1, the time required for the detent roller 26 to reach the bottom of the valley portion 212 is time Xd2, and the time required for the detent roller 26 to reach the wall portion 214 is time Xd3.

The process of the time x40 is the same as the process of the time x10 in FIG. 7. When the motor drive time Xd exceeds the time Xd1 at the time x41, it is considered that the detent roller 26 exceeds the mountain portion 215, and the energization to the motor 10 is turned off. Further, when the motor drive time Xd becomes the time Xd2 at the time x42, it may be considered that the detent roller 26 is located at the valley portion 212, and the energization of the motor 10 may be turned off. Furthermore, when the motor drive time Xd reaches the time Xd3 at the time x43, it may be considered that the detent roller 26 is in contact with the wall portion 214, and the energization of the motor 10 may be turned off. The time Xd1, Xd2, and Xd3 may be variable according to an input voltage V and a temperature. The same effects as those of the above embodiments can be obtained even in the configuration described above.

Fifth Embodiment

A fifth embodiment will be described with reference to FIG. 13. In the motor control process of the present embodiment, the determination of reaching the energization off position of the detent roller 26 in S304 is different from that of the third embodiment, and the determination of reaching the energization off position of the detent roller 26 is made based on an energization amount A (see equation (1)) instead of the detection value of the output shaft sensor 16. FIG. 13 shows the motor current Im instead of the output shaft angle θs in FIG. 11. In the present embodiment, when the detent roller 26 reaches the bottom of the valley portion 212, the energization of the motor 10 is turned off. The timing for turning off the energization of the motor 10 may be any timing at which the detent roller 26 can be stopped within the NotP range range, as in the above embodiment.

The process of the time x50 is the same as the process of the time x10 in FIG. 7. When the energization amount A reaches the energization amount determination value Ath at the time x52, it is considered that the detent roller 26 is located at the bottom of the valley portion 212, and the energization to the motor 10 is turned off. The energization amount determination value Ath may be variable according to the input voltage V and the temperature.

Further, as shown by the dashed line, when a relatively larger current than that shown by the solid line is flowing, the detent roller 26 reaches the bottom of the valley portion 212 in a relatively short time. In FIG. 13, when the energization amount A becomes the energization amount determination value Ath at the time x51, the energization of the motor 10 is turned off at the time x51, and the process proceeds to the standby mode.

In the present embodiment, the positioning determination unit 54 determines whether or not the detent roller 26 can be stopped within the positioning range based on the energization amount which is the integrated value of the motor current Im. This makes it possible to appropriately determine whether or not the detent roller 26 can be stopped within the positioning range. In addition, the same effects as those of the above embodiment can be obtained.

In the embodiment, the shift-by-wire system 1 corresponds to a "motor drive system", the shift range switching mechanism 20 corresponds to a "detent mechanism", the detent plate 21 corresponds to a "detent member", the detent roller 26 corresponds to an "engagement member", and the shift range control device 40 corresponds to a "motor control device".

Other Embodiments

In the above embodiment, the motor is a motor with a brush. In other embodiments, the motor may be something other than the motor with brush, such as a switched reluctance motor or a brushless motor. Further, in the above embodiment, the motor is not provided with the motor rotation angle sensor. In another embodiment, the motor may be provided with a motor rotation angle sensor. In this case, for example, when an abnormality occurs in the motor rotation angle sensor, the positioning control of the above embodiment may be performed.

According to the embodiments described above, the two valley portions are formed in the detent plate. As another embodiment, the number of the valley portions is not limited to two and may be three or more. The shift range switching mechanism and the parking lock mechanism or the like may be different from those in the embodiments described above. Further, in the above embodiment, the motor control device is applied to the shift range switching system. In other embodiments, the motor control device may be applied to an in-vehicle system other than the shift range switching system, or a motor drive system other than the in-vehicle.

In the embodiment described above, the speed reducer is placed between the motor shaft and the output shaft. Although the detail of the speed reducer is not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. As another embodiment, the speed reducer between the motor shaft and the output shaft may be omitted, or a mechanism other than the speed reducer may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A motor control device that controls a drive of a motor in a motor drive system including the motor and a detent mechanism having a detent member provided with a plurality of valley portions, a mountain portion separating the valley portions, and wall portions provided at both ends of the valley portions arranged, and configured to rotate integrally with an output shaft to which the rotation of the motor is transmitted, and an engaging member that moves the valley portion by rotation of the motor and positions the output shaft by stopping within a positioning range, the motor control device comprising:
    a positioning determination unit configured to determine whether or not the engaging member can be stopped within a positioning range based on a motor current energized in the motor other than a detection value of a motor rotation angle sensor that detects a motor rotation angle; and
    an energization control unit configured to turn off the energization of the motor, when it is determined that the engaging member is stopped within the positioning range, wherein
    when it is determined that the engaging member is stopped within the positioning range by contacting the engaging member with the wall portion,
    the energization control unit reduces a motor current energized to the motor compared to before reaching a current reduction position, when it is determined that the engaging member has reached the current reduction position on a front side where the engaging member is in contact with the wall portion, and
    the positioning determination unit determines that the engaging member is in contact with the wall portion, and the engaging member is stopped within the positioning range, when a state in which the motor current increases after the motor current is reduced, and the motor current is equal to or higher than a contact determination value continues for a contact determination time.

2. A motor control method for controlling a drive of a motor in a motor drive system including the motor and a detent mechanism having a detent member provided with a plurality of valley portions, a mountain portion separating the valley portions, and wall portions provided at both ends of the valley portions arranged, and configured to rotate integrally with an output shaft to which the rotation of the motor is transmitted, and an engaging member that moves the valley portion by rotation of the motor and positions the output shaft by stopping within a positioning range, the motor control method comprising the steps of:
    determining whether or not the engaging member is stopped within a positioning range based on a motor current energized in the motor,
    turning off the energization of the motor, when it is determined that the engaging member is stopped within the positioning range,
    when it is determined that the engaging member is stopped within the positioning range by contacting the engaging member with the wall portion,
    reducing a motor current energized to the motor compared to before reaching a current reduction position, when it is determined that the engaging member has reached the current reduction position on a front side where the engaging member is in contact with the wall portion, and
    determining that the engaging member is in contact with the wall portion, and the engaging member is stopped within the positioning range, when a state in which the motor current increases after the motor current is reduced, and the motor current is equal to or higher than a contact determination value continues for a contact determination time.

3. A motor drive system, comprising:
    a motor;
    a detent mechanism including
    a detent member provided with a plurality of valley portions, a mountain portion separating the valley portions, and wall portions provided at both ends of the valley portions arranged, and configured to rotate integrally with an output shaft to which the rotation of the motor is transmitted, and
    an engaging member configured to move the valley portion by rotation of the motor and positions the output shaft by stopping within a positioning range;
    a motor control device configured to control a drive of the motor; and
    a computer including a processor and a memory that stores instructions configured to, when executed by the processor, cause the processor to
    determine whether or not the engaging member is stopped within a positioning range based on a motor current energized in the motor,
    turn off the energization of the motor, when it is determined that the engaging member is stopped within the positioning range,
    when it is determined that the engaging member is stopped within the positioning range by contacting the engaging member with the wall portion,
    reduce a motor current energized to the motor compared to before reaching a current reduction position, when it is determined that the engaging member has reached the current reduction position on a front side where the engaging member is in contact with the wall portion, and
    determine that the engaging member is in contact with the wall portion, and the engaging member is stopped within the positioning range, when a state in which the motor current increases after the motor current is reduced, and the motor current is equal to or higher than a contact determination value continues for a contact determination time.

4. The motor control device according to claim 1, wherein the determination that the engaging member has reached the current reduction position is based on a time integral value of the motor current.

5. The motor control method according to claim 2, wherein the determination that the engaging member has reached the current reduction position is based on a time integral value of the motor current.

6. The motor drive system according to claim 3, wherein the determination that the engaging member has reached the current reduction position is based on a time integral value of the motor current.

* * * * *